(12) United States Patent
Lin et al.

(10) Patent No.: US 12,201,159 B2
(45) Date of Patent: Jan. 21, 2025

(54) ELECTRONIC CIGARETTE PREHEATING METHOD TO ENSURE PREPARATION OF LIQUID AEROSOL MATERIAL

(71) Applicant: HUIZHOU HAPPY VAPING TECHNOLOGY LIMITED, Guangdong (CN)

(72) Inventors: Guangrong Lin, Guangdong (CN); Xianbin Zheng, Guangdong (CN); Xiyong Zhang, Guangdong (CN)

(73) Assignee: HUIZHOU HAPPY VAPING TECHNOLOGY LIMITED, Huizhou (CN)

( * ) Notice: Subject to any disclaimer, the term of this patent is extended or adjusted under 35 U.S.C. 154(b) by 528 days.

(21) Appl. No.: 17/603,573

(22) PCT Filed: Jun. 3, 2020

(86) PCT No.: PCT/CN2020/094080
§ 371 (c)(1),
(2) Date: Oct. 13, 2021

(87) PCT Pub. No.: WO2020/259236
PCT Pub. Date: Dec. 30, 2020

(65) Prior Publication Data
US 2022/0192274 A1    Jun. 23, 2022

(30) Foreign Application Priority Data
Jun. 26, 2019    (CN) .......................... 201910562926.2

(51) Int. Cl.
*A24F 40/57* (2020.01)
*A24F 40/10* (2020.01)
(Continued)

(52) U.S. Cl.
CPC .............. *A24F 40/57* (2020.01); *A24F 40/10* (2020.01); *A24F 40/50* (2020.01); *A24F 40/51* (2020.01);
(Continued)

(58) Field of Classification Search
CPC .......... A24F 40/57; A24F 40/10; A24F 40/50; A24F 40/51; A24F 40/60; A24F 40/53;
(Continued)

(56) References Cited

U.S. PATENT DOCUMENTS

2018/0177240 A1* 6/2018 Duque .................... A24F 40/44
2020/0038601 A1* 2/2020 Hepworth ............. A61M 15/06

FOREIGN PATENT DOCUMENTS

| CN | 104770885 A | 7/2015 |
| CN | 108783595 A | 11/2018 |

(Continued)

OTHER PUBLICATIONS

International Search Report of PCT Patent Application No. PCT/CN2020/094080 issued on Sep. 9, 2020.

*Primary Examiner* — Justin M Kratt

(57) ABSTRACT

An electronic cigarette preheating method comprises setting preheating parameters and preheating routine in a microcontroller MCU. The preheating parameters at least include preset temperature value, and preset heating time or preset target temperature value. The preheating routine comprises: after turning on the electronic cigarette, activating preheating function when preheating button arranged on the electronic cigarette is pressed, detecting real-time temperature value by means of a temperature sensor; by means of the microcontroller MCU, comparing the real-time temperature value with the preset temperature value, and determining whether preheating of the cigarette liquid stored inside the liquid storage chamber is required. If no, directly entering an
(Continued)

available stand-by state. If yes, controlling a heating device by means of the microcontroller MCU to perform preheating for the preset heating time or until the preset target temperature value is reached, and then ending the preheating and entering the available stand-by state.

9 Claims, 2 Drawing Sheets

(51) Int. Cl.
    *A24F 40/50*     (2020.01)
    *A24F 40/51*     (2020.01)
    *A24F 40/60*     (2020.01)
    *G05D 23/19*     (2006.01)
    *H05B 1/02*     (2006.01)
    *A24F 40/53*     (2020.01)

(52) U.S. Cl.
    CPC ......... *A24F 40/60* (2020.01); *G05D 23/1917* (2013.01); *H05B 1/0244* (2013.01); *A24F 40/53* (2020.01); *G05D 23/19* (2013.01); *H05B 2203/021* (2013.01)

(58) Field of Classification Search
    CPC .. G05D 23/1917; G05D 23/19; H05B 1/0244; H05B 2203/021
    See application file for complete search history.

(56) References Cited

FOREIGN PATENT DOCUMENTS

| | | | | |
|---|---|---|---|---|
| CN | 109613945 A | * | 4/2019 | |
| CN | 110200327 A | | 9/2019 | |
| CN | 110200329 A | | 9/2019 | |
| CN | 110200330 A | | 9/2019 | |
| CN | 110604344 A | | 12/2019 | |
| WO | WO-2020248475 A1 | * | 12/2020 | ............. A24F 40/20 |

* cited by examiner

ELECTRONIC CIGARETTE PREHEATING METHOD TO ENSURE PREPARATION OF LIQUID AEROSOL MATERIAL

TECHNICAL FIELD

The disclosure relates to the field of electronic cigarette preheating technology, more particularly to an electronic cigarette preheating method.

BACKGROUND

The electronic cigarette usually heats and vaporizes liquid substances or paste-like substances, such as drugs and cigarette liquid, to generate aerosol or vapor for users to use. As people pay more attention to their health, they realize that tobacco may be harmful to health. Thus, the electronic cigarettes are widely used.

The electronic cigarette usually comprises cigarette liquid and a heating device for vaporizing the cigarette liquid. The cigarette liquid usually is stored inside the liquid storage chamber. During vaporization, the cigarette liquid stored inside the liquid storage chamber may be permeated or fed to the heating device.

Usually, when an existing electronic cigarette is turned on to operate, no preheating method is provided to automatically determine how to warm up the electronic cigarette. In particular when the electronic cigarette is used in cold winter or at cold areas such as higher latitudes or higher elevations, the viscosity of the cigarette liquid or tobacco tar or liquid substances containing drugs of the electronic cigarette is increased and the fluidity thereof is reduced due to the low temperature. In such a case, it is not easy for the cigarette liquid or drugs to be permeated or fed to the heating device for vaporization, such that the vapor can hardly be produced when the electronic cigarette initially starts. In this instance, it is desired to provide a preheating method which preheats the cigarette liquid or liquid substances containing drugs by means of the heating device when the electronic cigarette is turned on, to facilitate production of the vapor.

SUMMARY

Technical Problem

An object of the disclosure is to overcome the above shortcomings and provide an electronic cigarette preheating method.

Technical Solutions

The disclosure provides a technical solution as follows. According to an electronic cigarette preheating method, setting preheating parameters and a preheating routine in a microcontroller unit MCU arranged in the electronic cigarette, wherein the preheating parameters at least include a preset temperature value, and a preset heating time or a preset target temperature value, and the preheating routine comprises: after turning on the electronic cigarette, activating a preheating function when a preheating button arranged on the electronic cigarette is pressed, detecting a real-time temperature value by means of a temperature sensor arranged in the electronic cigarette; by means of the MCU, comparing the real-time temperature value with the preset temperature value, and determining whether the preheating of the cigarette liquid stored inside the liquid storage chamber is required or not. If no, directly entering an available stand-by state of the electronic cigarette. If yes, controlling a heating device arranged in the electronic cigarette by means of the MCU to perform the preheating for the preset heating time or until the preset target temperature value is reached, and then ending the preheating and entering the available stand-by state of the electronic cigarette. In addition, deactivating the preheating function when the preheating button is pressed, and then stopping the preheating routine by means of the MCU such that the heating device is controlled to not preheat or stop preheating.

Preferably, the preheating parameters may further include the preset stand-by time. The preheating routine may comprise, after entering the available stand-by state of the electronic cigarette, automatically shutting down the electronic cigarette if the electronic cigarette detects that the user does not take even a puff within the preset stand-by time.

Preferably, the preheating routine may further comprise, by means of the MCU, recurrently detecting real-time temperature within the preset stand-by time and comparing the real-time temperature with the preset temperature value to determine whether the preheating is required again or not. If yes, controlling the heating device of the electronic cigarette by means of the MCU to perform heating again.

Preferably, the preheating routine may further comprise, when it is determined by means of the MCU that the preheating is required, controlling an LED indicator light arranged on the electronic cigarette by means of the MCU to emit light for warning. When the preheating is finished, controlling a vibrator arranged on the electronic cigarette by means of the MCU to provide vibration for warning.

Preferably, the preset heating time may be a constant value or set as a function which is inversely proportional to the real-time temperature value, that is, the lower the real-time temperature value, the longer the period of the preset heating time.

Preferably, the preheating parameters may further comprise a preset preheating power, and the preset preheating power may be a constant value or set as a function which is inversely proportional to the real-time temperature value, that is, the lower the real-time temperature value, the greater the preset preheating power.

Preferably, the preset preheating power may be a constant value set to a range of 2 W-6 W.

Preferably, the preset temperature value may be set to a range of −10° C.-10° C., the preset heating time may be set to a range of 1-5 seconds or the preset target temperature value may be set to a range of 10° C.-80° C., and the preset stand-by time may be set to a range of 5-10 minutes.

Preferably, the method may comprise steps of:
(1) setting the preheating parameters and preheating routine on the MCU;
(2) turning on the electronic cigarette;
(3) selectively switching on or off the preheating button;
(4) by means of the MCU, determining whether a switching signal of the preheating button is received, if no or switching off signal is received, go to step (9); if a switching on signal is received, go to the next step;
(5) detecting the real-time temperature value by means of the temperature sensor, and reading the real-time temperature value by means of the MCU;
(6) determining whether the real-time temperature value is greater than the preset temperature value or not by means of the MCU, if yes, go to step (9); if no, go to next step;
(7) controlling the heating device by means of the MCU to perform heating;

(8) ending the preheating after the heating is performed for the preset heating time or when the preset target temperature value is reached;
(9) entering the available stand-by state of the electronic cigarette.

Preferably, the method may comprise steps of:
(1) setting preheating parameters and a preheating routine on the MCU;
(2) turning on the electronic cigarette;
(3) selectively switching on or off the preheating button;
(4) by means of the MCU, determining whether the switching signal of the preheating button is received, if no or the switching off signal is received, go to step (10); if the switching on signal is received, go to the next step;
(5) detecting the real-time temperature value by means of the temperature sensor, and reading the real-time temperature value by means of the MCU;
(6) determining whether the real-time temperature value is greater than the preset temperature value or not by means of the MCU, if yes, go to step (10); if no, go to the next step;
(7) emitting light for warning by means of the LED indicator light as the preheating is required;
(8) controlling the heating device by means of the MCU to perform heating;
(9) ending the preheating after the heating is performed for the preset heating time or when the preset target temperature value is reached;
(10) providing vibration for warning by means of the vibrator, and entering the available stand-by state of the electronic cigarette;
(11) going back to step (5) as a period of the preset stand-by time does not pass;
(12) automatically shutting down the electronic cigarette when the stand-by time exceeds the preset stand-by time.

Advantages

The electronic cigarette preheating method according to the disclosure achieve parameter and routine setting and controlling by the MCU. The automatic preheating control routine is provided. After detecting real-time temperature, it is capable of automatically determining whether the preheating is required. The heating device of the electronic cigarette is used to perform heating and generate heat energy. As the heat energy is transferred to the liquid storage chamber of the electronic cigarette, the cigarette liquid or liquid substances containing drugs may be preheated such that the viscosity may be reduced and the fluidity may be increased. In this way, even when the electronic cigarette is used in cold winter or at cold areas such as higher latitudes or higher elevations, the cigarette liquid or tobacco tar or liquid substances containing drugs of the electronic cigarette may be preheated at such low temperatures, facilitating the cigarette liquid or drugs to penetrate or flow to the heating device of the electronic cigarette for vaporization. Hence, the electronic cigarette may produce vapor even at low temperature.

DETAILED DESCRIPTION OF ILLUSTRATED EMBODIMENTS

Figure 1:
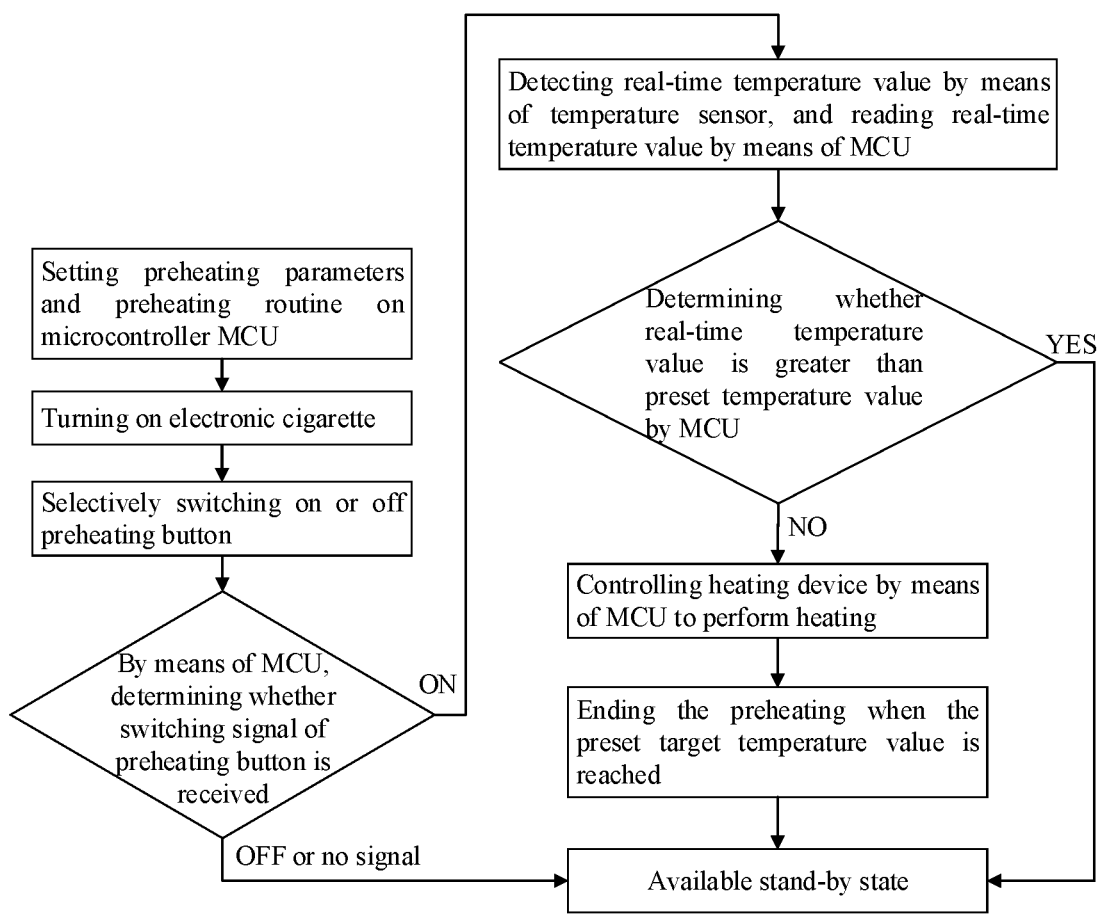
FIG. 1 is a first flow chart of a control method according to the disclosure.

In order to make purposes, technical solutions and advantages of the disclosure clearer, the disclosure will be further explained in detail with reference to drawings and embodiments described hereinafter. It should be understood that the specific embodiments described herein are only used to explain the present invention and are not intended to limit the present invention.

According to an electronic cigarette preheating method of the disclosure, setting preheating parameters and a preheating routine in a MCU arranged in the electronic cigarette, wherein the preheating parameters at least include a preset temperature value, and a preset heating time or a preset target temperature value, and the preheating routine comprises: after turning on the electronic cigarette, activating a preheating function when a preheating button arranged on the electronic cigarette is pressed, detecting real-time temperature value by means of a temperature sensor arranged in the electronic cigarette; by means of the MCU, comparing the real-time temperature value with the preset temperature value, and determining whether the preheating of the cigarette liquid stored inside the liquid storage chamber is required or not. If it is determined that the preheating is not required as the real-time temperature value is greater than the preset temperature value, directly entering an available stand-by state of the electronic cigarette. If it is determined that the preheating is required as the real-time temperature value is lower than the preset temperature value, controlling a heating device arranged in the electronic cigarette by means of the MCU to perform the preheating for the preset heating time or until the preset target temperature value is reached, and then ending the preheating and entering the available stand-by state of the electronic cigarette. In addition, deactivating the preheating function when the preheating button is pressed, and then stopping the preheating routine by means of the MCU such that the heating device is controlled to not preheat or stop preheating. During the above procedure, the preheating button may have a default setting of shutting down the preheating function when it is not operated. Among the preheating parameters in the method, either the preset heating time or the preset target temperature value, but not both at the same time, may be set to achieve function.

The preheating button may be set in such a manner that the preheating function is activated or deactivated when the preheating button is continuously pressed different times. For example, the preheating function may be activated when the preheating button is pressed one time, and may be deactivated when the preheating button is continuously pressed two times.

The heating device is arranged inside the electronic cigarette, and the heating coil is arranged inside the heating device. When the heating coil is energized, it generates heat and heats the cigarette liquid of the electronic cigarette such that the cigarette liquid may be vaporized at high temperature to produce electronic cigarette vapor. The temperature sensor is arranged in the electronic cigarette. Since the preheating aims to the cigarette liquid stored inside the liquid storage chamber and the detection of real time temperature mainly refers to the determination of the temperature of the cigarette liquid, it is advantageous that the temperature sensor is arranged as close as possible to the liquid storage chamber of the electronic cigarette. The cigarette liquid stored inside the liquid storage chamber according to the disclosure may be flowable cigarette liquid, or tobacco tar having poor fluidity or waxy solid formed by solidification of tobacco tar, or liquid substances containing drugs or waxy solid formed by solidification of drug liquid, etc.

Further, the preheating parameters may further include the preset stand-by time. The preheating routine may comprise, after entering the available stand-by state of the electronic cigarette, automatically shutting down the electronic cigarette if the electronic cigarette detects that the user does not take even a puff within the preset stand-by time. The preheating routine may further comprise, by means of the MCU, recurrently detecting real-time temperature within the preset stand-by time and comparing the real-time temperature with the preset temperature value to determine whether the preheating is required again or not. If yes, controlling the heating device of the electronic cigarette by means of the MCU to perform heating again.

The preheating routine may further comprise, when it is determined by means of the MCU that the preheating is required, controlling the LED indicator light arranged on the electronic cigarette by means of the MCU to emit light for warning. When the preheating is finished, controlling the vibrator arranged on the electronic cigarette by means of the MCU to provide vibration for warning. In this way, it is convenient to inform the user of the operating state of the electronic cigarette in time.

The preset heating time may be a constant value or set as a function which is inversely proportional to the real-time temperature value, that is, the lower the real-time temperature value, the longer the period of the preset heating time. In such a case, the preset heating time may be automatically adjusted depending on the real-time ambient temperature of the electronic cigarette. Hence, the heating device may be controlled to have longer period of the preheating time at lower real-time temperature, such that the cigarette liquid of the electronic cigarette stored inside the liquid storage chamber may have lower viscosity and higher fluidity, and the electronic cigarette may easily produce vapor.

The preheating parameters may further comprise a preset preheating power, and the preset preheating power may be a constant value or set as a function which is inversely proportional to the real-time temperature value, that is, the lower the real-time temperature value, the greater the preset preheating power and the preheating efficiency.

The preset preheating power may be a constant value set to a range of 2 W-6 W.

The preset temperature value may be set to a range of −10° C.-10° C., the preset heating time may be set to a range of 1-5 seconds or the preset target temperature value may be set to a range of 10° C.-80° C., and the preset stand-by time may be set to a range of 5-10 minutes.

First Embodiment

Referring to FIG. 1, the electronic cigarette preheating method according to the first embodiment comprises steps as follows.
(1) Setting preheating parameters and a preheating routine on the MCU, for example, the preset temperature value may be set to 0° C., and the preset target temperature value may be set to 30° C.;
(2) Turning on the electronic cigarette;
(3) Selectively switching on or off the preheating button;
(4) By means of the MCU, determining whether switching signal of the preheating button is received, if no or switching off signal is received, go to step (9) to deactivate the preheating function; if switching on signal is received, go to next step to activate the preheating function;
(5) Detecting the real-time temperature value by means of the temperature sensor, and reading the real-time temperature value by means of the MCU;
(6) Determining whether the real-time temperature value is greater than the preset temperature value 0° C. or not by means of the MCU, if yes, go to step (9) as the preheating is not required; if no, go to next step as the preheating is required;
(7) Controlling the heating device by means of the MCU to perform heating;
(8) Ending the preheating when the preset target temperature value 30° C. is reached;
(9) Entering the available stand-by state of the electronic cigarette.

Second Embodiment

Figure 2:
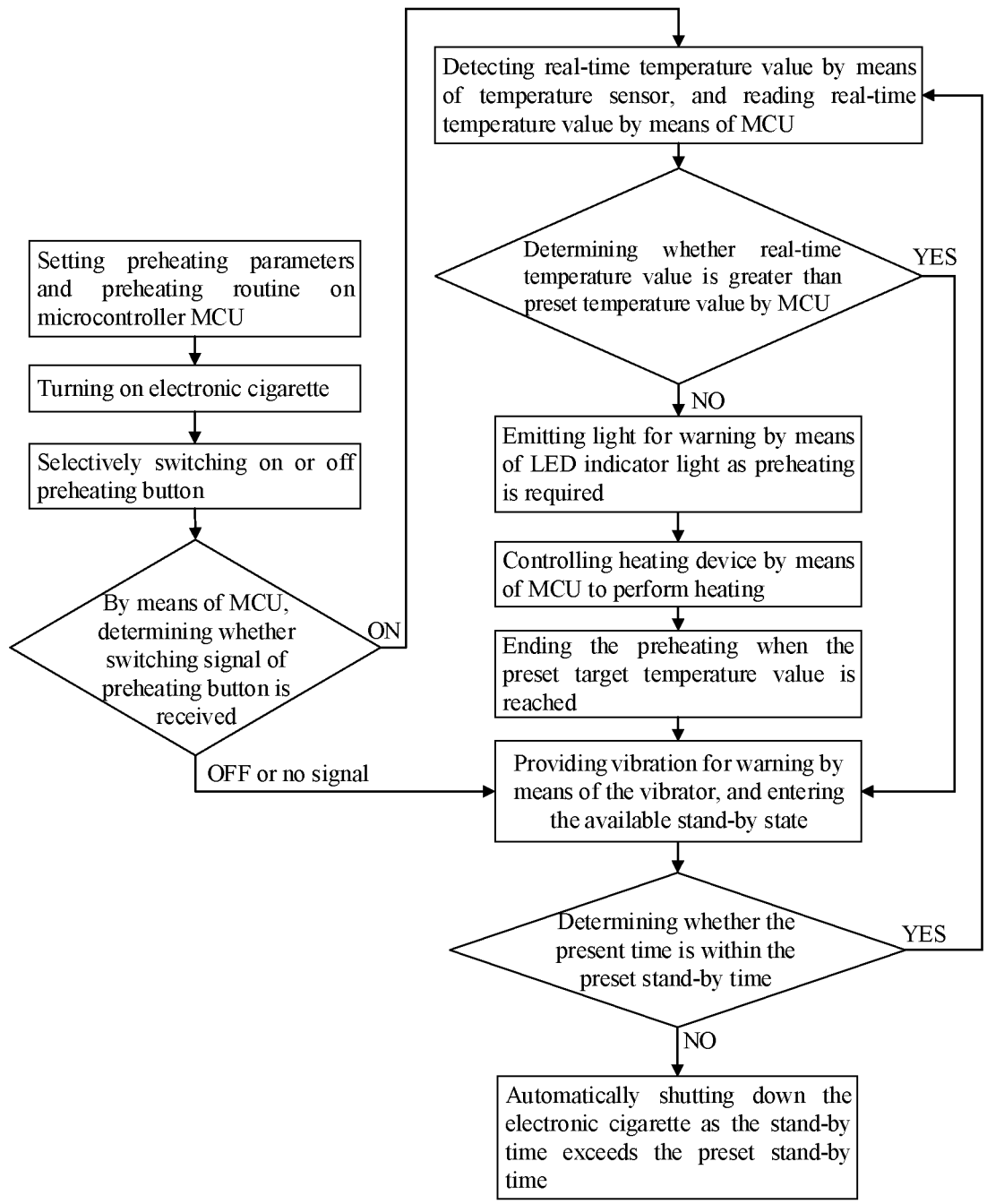
FIG. 2 is a second flow chart of a control method according to the disclosure.

Referring to FIG. 2, the electronic cigarette preheating method according to the second embodiment comprises steps as follows.
(1) Setting preheating parameters and a preheating routine on the MCU, for example, the preset temperature value may be set to 10° C., the preset heating time may be set to 3 seconds, and the preset stand-by time may be set to 8 minutes;
(2) Turning on the electronic cigarette;
(3) Selectively switching on or off the preheating button;
(4) By means of the MCU, determining whether switching signal of the preheating button is received, if no or switching off signal is received, go to step (10) to deactivate the preheating function; if switching on signal is received, go to next step to activate the preheating function;
(5) Detecting the real-time temperature value by means of the temperature sensor, and reading the real-time temperature value by means of the MCU;
(6) Determining whether the real-time temperature value is greater than the preset temperature value 10° C. or not by means of the MCU, if yes, go to step (10) as the preheating is not required; if no, go to next step as the preheating is required;
(7) As the preheating is required, emitting light for warning by means of the LED indicator light, for example, emitting red light for warning of waiting for the preheating procedure;
(8) Controlling the heating device by means of the MCU to perform heating;
(9) Ending the preheating after the heating is performed for the preset heating time, i.e., 3 seconds;
(10) Providing vibration for warning by means of the vibrator, and entering the available stand-by state of the electronic cigarette;
(11) Going back to step (5) as the preset stand-by time 8 minutes do not pass;
(12) Automatically shutting down the electronic cigarette when the user does not take even a puff within the stand-by time which exceeds the preset stand-by time 8 minutes.

MCU shown in FIGS. 1 and 2 refers to the MCU.

INDUSTRIAL APPLICABILITY

All the above are merely preferred embodiments of the disclosure. The present invention is intended to cover all modifications and equivalent arrangements those skilled in the art can make according to the technical essence of the present invention.

The invention claimed is:

1. An electronic cigarette preheating method, comprising setting preheating parameters and a preheating routine in a microcontroller unit (MCU) arranged in an electronic cigarette, wherein the preheating parameters at least include a preset temperature value, and a preset heating time or a preset target temperature value, and the preheating routine comprises: after turning on the electronic cigarette, determining whether a switching signal of a preheating button arranged on the electronic cigarette is received by means of the MCU,
   if a switching on signal is received, activating a preheating function, detecting a real-time temperature value by means of a temperature sensor arranged in the electronic cigarette; by means of the MCU, comparing the real-time temperature value with the preset temperature value, to determine whether preheating of cigarette liquid stored inside a liquid storage chamber is required or not, if no, directly entering an available stand-by state of the electronic cigarette; if yes, controlling a heating device arranged in the electronic cigarette by means of the MCU to perform preheating for the preset heating time or until the preset target temperature value is reached, and then ending the preheating and entering the available stand-by state of the electronic cigarette; and
   if no or a switching off signal is received, deactivating the preheating function, stopping the preheating routine by means of the MCU such that the heating device is controlled to not preheat or stop preheating, and entering the available stand-by state of the electronic cigarette; and
   the method comprises steps of:
   (1) setting the preheating parameters and the preheating routine on the MCU;
   (2) turning on the electronic cigarette;
   (3) selectively switching on or off the preheating button;
   (4) by means of the MCU, determining whether the switching signal of the preheating button is received, if no or the switching off signal is received, go to step (9); if the switching on signal is received, go to the next step;
   (5) detecting the real-time temperature value by means of the temperature sensor, and reading the real-time temperature value by means of the MCU;
   (6) determining whether the real-time temperature value is greater than the preset temperature value or not by means of the MCU, if yes, go to step (9); if no, go to the next step;
   (7) controlling the heating device by means of the MCU to perform heating;
   (8) ending the preheating after the heating is performed for the preset heating time or when the preset target temperature value is reached;
   (9) entering the available stand-by state of the electronic cigarette.

2. The electronic cigarette preheating method according to claim 1, wherein the preheating parameters further comprises a preset stand-by time, and the preheating routine further comprises, after entering the available stand-by state of the electronic cigarette, automatically shutting down the electronic cigarette if the electronic cigarette detects that the user does not take even a puff within the preset stand-by time.

3. The electronic cigarette preheating method according to claim 2, wherein the preheating routine further comprises, by means of the MCU, recurrently detecting real-time temperature within the preset stand-by time and comparing the real-time temperature with the preset temperature value to determine whether the preheating is required again or not, if yes, controlling the heating device of the electronic cigarette by means of the MCU to perform heating again.

4. The electronic cigarette preheating method according to claim 3, wherein the preheating routine further comprises, controlling an LED indicator light arranged on the electronic cigarette by means of the MCU to emit light for warning when the MCU determines that the preheating is required, and controlling a vibrator arranged on the electronic cigarette by means of the MCU to provide vibration for warning when the preheating is finished.

5. The electronic cigarette preheating method according to claim 4, comprising steps of:
   (1) setting the preheating parameters and the preheating routine on the MCU;
   (2) turning on the electronic cigarette;
   (3) selectively switching on or off the preheating button;
   (4) by means of the MCU, determining whether the switching signal of the preheating button is received, if no or the switching off signal is received, go to step (10); if the switching on signal is received, go to the next step;
   (5) detecting the real-time temperature value by means of the temperature sensor, and reading the real-time temperature value by means of the MCU;
   (6) determining whether the real-time temperature value is greater than the preset temperature value or not by means of the MCU, if yes, go to step (10); if no, go to the next step;
   (7) emitting light for warning by means of the LED indicator light as the preheating is required;
   (8) controlling the heating device by means of the MCU to perform heating;
   (9) ending the preheating after the heating is performed for the preset heating time or when the preset target temperature value is reached;
   (10) providing vibration for warning by means of the vibrator, and entering the available stand-by state of the electronic cigarette;
   (11) going back to step (5) as a period of the preset stand-by time does not pass;
   (12) automatically shutting down the electronic cigarette when the stand-by time exceeds the preset stand-by time.

6. The electronic cigarette preheating method according to claim 2, wherein the preset temperature value is set to a range of −10° C.-10° C., the preset heating time is set to a range of 1-5 seconds or the preset target temperature value is set to a range of 10° C.-80° C., and the preset stand-by time is set to a range of 5-10 minutes.

7. The electronic cigarette preheating method according to claim 1, wherein the preset heating time is a constant value or set as a function which is inversely proportional to the real-time temperature value, that is, the lower the real-time temperature value, the longer the period of the preset heating time.

8. The electronic cigarette preheating method according to claim 1, wherein the preheating parameters further comprise preset preheating power, and the preset preheating power is a constant value or set as a function which is inversely proportional to the real-time temperature value, that is, the lower the real-time temperature value, the greater the preset preheating power.

9. The electronic cigarette preheating method according to claim 8, wherein the preset preheating power is a constant value set to a range of 2 W-6 W.

* * * * *